United States Patent [19]
Yang et al.

[11] Patent Number: 6,121,817
[45] Date of Patent: Sep. 19, 2000

[54] ANALOG MEDIAN FILTER CIRCUIT FOR IMAGE PROCESSING

[75] Inventors: Hongli Yang, Sunnyvale; Datong Chen, Fremont, both of Calif.

[73] Assignee: OmniVision Technologies, Inc., Sunnyvale, Calif.

[21] Appl. No.: 09/228,251

[22] Filed: Jan. 11, 1999

[51] Int. Cl.[7] ...................................................... G06G 7/12
[52] U.S. Cl. .......................... 327/355; 327/407; 327/361
[58] Field of Search ................................... 327/355, 361, 327/357, 359, 363, 551, 407, 408, 409

[56] References Cited

U.S. PATENT DOCUMENTS 4,460,837   7/1984   Anderson, Jr. ............................. 327/68
5,521,543   5/1996   Shou et al. ................................ 327/355

OTHER PUBLICATIONS

Dietz, Paul H., and L. Richard Carley, "An Analog Circuit Technique for Finding the Median," in *IEEE 1993 Custom Integrated Circuits Conference*, 1993, pp. 6.1.1–6.1.4.

Lin, Shang–Yi, and Tzi–Dar Chiueh, "A New Analog Median Filter," Dept. of Electrical Engineering, National Taiwan University, Taipei, Taiwan, pp. 1–10.

Oflazer, Kemal, "Design and Implementation of a Single–Chip 1–D Median Filter," *IEEE Transactions on Acoustics, Speech, and Signal Processing*, ASSP–31(5) :1164–1168, 1983.

*Primary Examiner*—Toan Tran
*Attorney, Agent, or Firm*—Blakely, Sokoloff, Taylor & Zafman

[57] ABSTRACT

An analog median filter for rejecting isolated impulse noise while preserving signal step changes in image processing. The analog median filter includes a number of transconductance amplifiers with additional CMOS inverters coupled to the outputs of the amplifiers. The outputs of the inverters are coupled together in a feedback loop configuration with the amplifiers. The CMOS inverters act as a type of additional current source for the amplifiers, so as to sharpen the corners of the transfer curve at various current levels. The low gain of the inverters improve the stability of the output range. Because inverters are used, the feedback loop is coupled to the noninverting inputs of the amplifiers, while the input signals are coupled to the inverting inputs of the amplifiers.

20 Claims, 5 Drawing Sheets

ANALOG MEDIAN FILTER CIRCUIT FOR IMAGE PROCESSING

FIELD OF THE INVENTION

The present invention relates to metal oxide semiconductor (MOS) image sensors and, more particularly, to filters for removing noise signals in image processing.

BACKGROUND OF THE INVENTION

Integrated circuit technology has revolutionized various fields, including computers, control systems, telecommunications, and imaging. One field in which integrated circuitry is widely used is video imaging. Different types of semiconductor imagers include: charge coupled devices, photodiode arrays, charge injection devices, and hybrid focal plane arrays. Many of these devices include pixels that are arranged in sensor arrays to convert light images into electrical signals.

It is desirable in image sensors to remove noise from the signals that originate at the pixels and pass through the image sensor circuitry. One type of filter that has found an increasing application in image processing are median filters. As discussed in a paper titled "An Analog Circuit Technique for Finding the Median" by P. Dietz and R. Carley, IEEE 1993, Custom Integrated Circuits Conference, pp. 6.1.1–6.1.4, median filters have increased in use due to their ability to perfectly reject isolated impulse noise while preserving signal step changes.

FIG. 1A illustrates a traditional median filter 8. Median filter 8 includes three transconductance amplifiers 20a, 20b, and 20c. Transconductance amplifier 20a receives an input V1 at its noninverting input, while transconductance amplifier 20b receives an input V2 at its noninverting input, and transconductance amplifier 20c receives an input V3 at its noninverting input. The outputs of the transconductance amplifiers 20a, 20b, and 20c are tied together at an output $V_{out}$. The output $V_{out}$ is fed back to the transconductance amplifiers 20a, 20b, and 20c at their inverting inputs. Transconductance amplifier 20a has an output current $I_{20a}$, while transconductance amplifier 20b has an output current $I_{20b}$, and transconductance amplifier 20c has an output current $I_{20c}$.

FIG. 1B shows timing diagrams illustrating the operation of the median filter 8 of FIG. 1A. As illustrated in FIG. 1B, at time t0, the input V1 to amplifier 20a is at 3.5 volts, while the input V2 to amplifier 20b is at 2.5 volts, and the input V3 to amplifier 20c is at 2 volts. The output $V_{out}$ of median filter 8 is shown to be at 2.5 volts since, as will be described in more detail below, the output $V_{out}$ is following the input V2 at this time, since the input V2 is the median input of the three inputs at time t0.

The reasons why the output $V_{out}$ follows the median input can be explained with respect to the operating states of the individual amplifiers 20a, 20b, and 20c. As described above, at time t0, the noninverting input of amplifier 20a is at 3.5 volts, while the inverting input is at 2.5 volts. Assuming that the maximum range of the differential between the two inputs that can be amplified is a few millivolts, then the 1.0 positive volt input differential at time t0 will cause amplifier 20a to output its maximum positive current $I_{max}$. Meanwhile, the amplifier 20c has a voltage of 2.0 volts at its noninverting input and a voltage of 2.5 volts at its inverting input. This 0.5 negative volt input differential state, similar to amplifier 20a, causes the amplifier 20c to output its maximum negative current $-I_{max}$. The maximum positive current $I_{max}$ from the amplifier 20a and the maximum negative current $-I_{max}$ from amplifier 20c offset one another. The remaining amplifier 20b is thus left in a feedback loop configuration, whereby the output of the amplifier will follow the input voltage V2 at the noninverting input, as is well known in the art. Thus, in most states where the differential inputs are sufficient, this process will occur for whichever of the three amplifiers 20a, 20b, or 20c has the median input, while the higher and lower amplifiers will output offsetting maximum and minimum currents, respectively. Thus, the output of median filter 8 will follow the median input of the three input voltages V1, V2, or V3.

Returning to FIG. 1B, at time t1, input voltage V3 begins trending upward. At time t2, input voltage V3 crosses input voltage V2 at the 2.5 volt level. After time t2, the output $V_{out}$ of median filter 8 begins following the input voltage V3 of amplifier 20c. As described above, the output $V_{out}$ begins following the input V3 because the differential input voltages will cause the amplifier 20a to continue to output a positive maximum current $I_{max}$, while the amplifier 20b will begin to output a negative maximum current $-I_{max}$. This leaves amplifier 20c to output a voltage which follows the input V3 due to the feedback configuration.

At time t3, the input V3 crosses the input V1 at the 3.5 volt level. Following time t3, the output $V_{out}$ of median filter 8 begins to follow the input V1 of amplifier 20a. As described above, this occurs because differential input voltages will cause the amplifier 20b to continue to output a negative maximum current $-I_{max}$, while the amplifier 20c will begin to output a positive maximum current $I_{max}$. This leaves amplifier 20a to output a voltage which follows the input V1 due to the feedback configuration.

The operation of the median filter 8 illustrated above allows the median filter to effectively reject impulse noise, while preserving the signal step changes. However, certain problems have arisen with regard to the use of median filters in image processing. One publication which discusses some of the problems with median filters is "A New Analog Median Filter," by Shang-Yi Lin and Tzi-Dar Chiueh, published by the Department of Electrical Engineering of the National Taiwan University, Taipei, Taiwan 10617. As discussed in that paper, traditional implementations of the amplifiers such as 10a, 10b, and 10c of analog median filters have been based on several transconductors in a feedback configuration with their outputs connected together. The most common transconductor used in such systems is a differential pair. However, the finite slope of the I-V curve of the differential pair has tended to blunt the corners of the transfer curve. The linear range of traditional differential pairs can be expressed as follows:

$$-(2I_{SS}/\beta)^{\frac{1}{2}} \leq V_{ID} \leq (2I_{SS}/\beta)^{\frac{1}{2}} \qquad (1)$$

Where $I_{SS}$ is the bias current of the differential pair, $\beta$ is $(W/L)U_{ox}C$, and $V_{ID}$ is the differential input voltage. Bipolar technology provides no direct method for enlarging the linear range of the differential pair because the linear range is independent of the bias current and transistor size. In a CMOS implementation, there is strong interdependence between the transconductance and the width of the linear range. Two of the simplest ways to increase the transconductance of the differential pair are to increase the bias current or to increase the ratio of W/L. However, such methods require more power consumption and/or larger chip area.

FIGS. 2A, 2B, and 2C illustrate the problem of blunting the corners of the transfer curve, and are correlated to the timing diagram of FIG. 1B. FIG. 2A illustrates an ideal transfer curve for which the corners are shown to be relatively sharp. FIG. 2B illustrates an actual transfer curve of which the corners have been blunted as related to the finite linear range of the amplifiers. FIG. 2C illustrates the levels of the corner errors (a/k/a peak errors).

In attempting to improve the performance of median filters by reducing the corner errors, various circuit designers have developed improved transconductance amplifiers. One such transconductance amplifier that is proposed in the Lin paper discussed above is illustrated in FIG. 3A. In the circuit of FIG. 3A, the transistors M1 to M8 and the current sink $I_{SS}$ form a two-input winner-take-all circuit, which senses its two inputs V1 and V2 corresponding to two currents I1 and I2. If I1 is greater than I2, then I3 is equal to $I_{SS}$, I4 is equal to zero, and I0 is equal to $-I_{SS}$, and vice versa. I1 and I2 are controlled by two saturated MOS transistors, M5 and M8, with their gates connected to the inputs V1 and V2. Thus, if V1 is greater than V2, then I1 is less than I2; therefore, I0 will be equal to $I_{SS}$, and vice versa.

The Lin circuit described above does help sharpen the corners of the voltage transfer curve. However, this implementation is somewhat unstable and hard to tune for certain image processing applications because the input and output ranges are not sufficient for some circumstances. This is because there are two stages and the gain is too high, so that the filter is unable to achieve a stable range where the output swings are not unacceptably large for the given inputs.

Another improved transconductance amplifier is illustrated in FIG. 3B. The circuit of FIG. 3B is disclosed in "Analogue Median Circuit," by I. Opris and G. Kovacs, *Electronics Letters*, 30(17):1369–1370, August (1994). This circuit uses a folded topology that can effectively reduce the linear range by decreasing the saturation current. However, one problem with this implementation is that the width of the linear range cannot be made infinitely small because of current mismatches, and any small saturation currents will degrade the frequency response.

Another prior art method for reducing corner errors is to insert a gain stage between the input signals and the differential pair for decreasing the effective width of the linear range, as disclosed in "An Analog Circuit Technique for Finding the Median," by Paul H. Dietz and L. Richard Carley, IEEE Custom Integrated Circuits Conference, 1993. However, the saturation of the gain stage and the additional phase leg tend to degrade the transient response of the circuit and, in addition, long transistors are required for implementing the gain stage.

The present invention is directed to a circuit that overcomes the foregoing and other problems in the prior art. More specifically, the present invention is directed to an analog median filter for image processing that maintains a sharp transfer curve with an acceptable level of stability.

SUMMARY OF THE INVENTION

An analog median filter for image processing is disclosed. According to the invention, sharp corners for the transfer curve are maintained by providing additional CMOS inverters at the outputs of the transconductance amplifiers. The CMOS inverters act as a type of additional current source. For traditional transconductance amplifiers, the voltage transfer curve can be produced with relatively sharp corners. However, the current requirements of some applications tend to blunt the corners. By adding additional CMOS inverters, for which the gain is very low, additional current can be provided to sharpen the corners of the transfer curve. In addition, the low gain of the inverters allows a stable output to be produced more easily.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
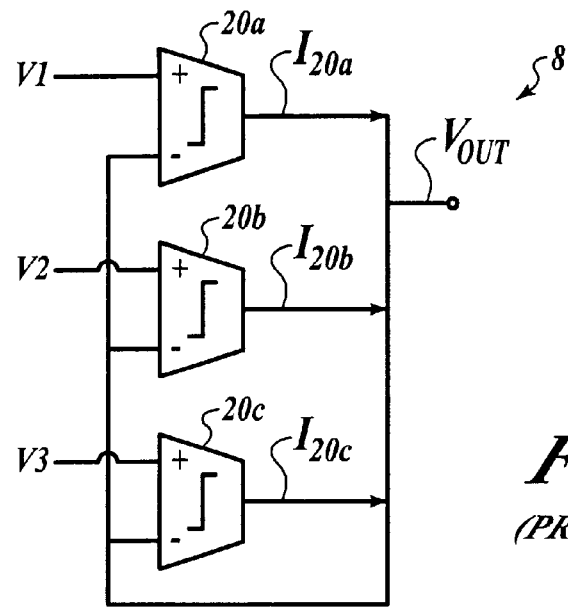
FIG. 1A is a schematic diagram of a general prior art analog median filter.
Figure 1B:
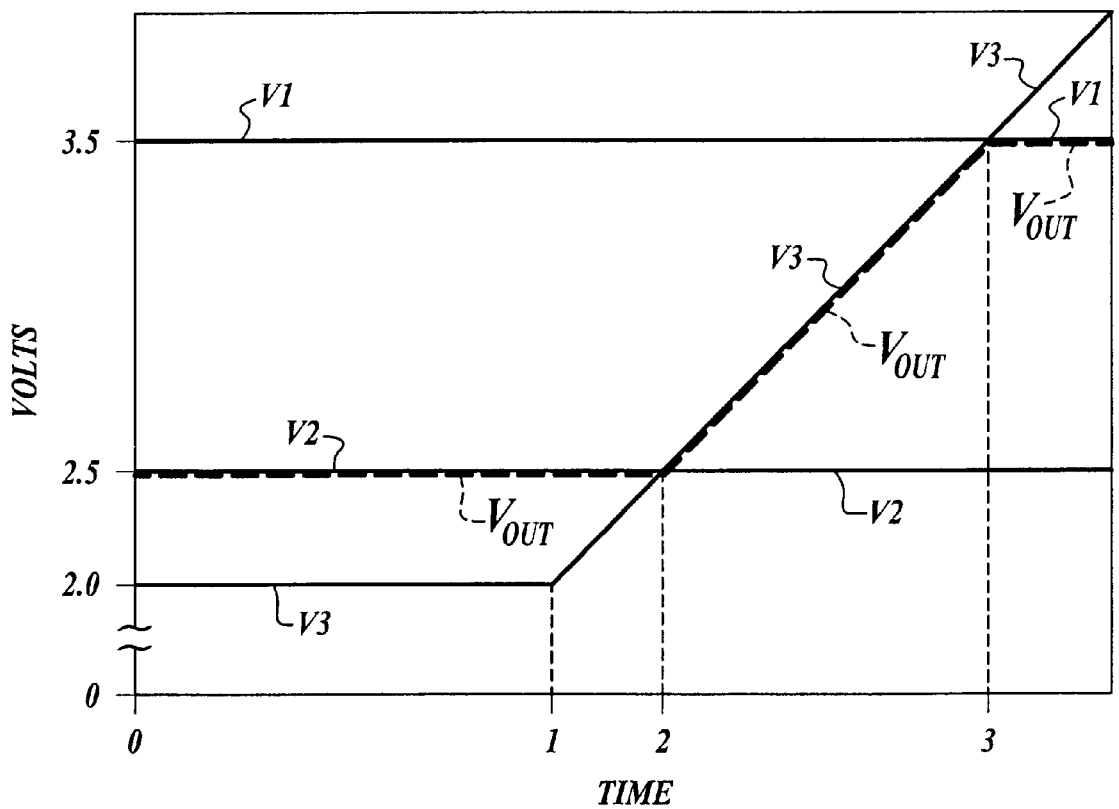
FIG. 1B is a timing diagram illustrating the operation of the prior art circuit of FIG. 1A.
Figure 2A:
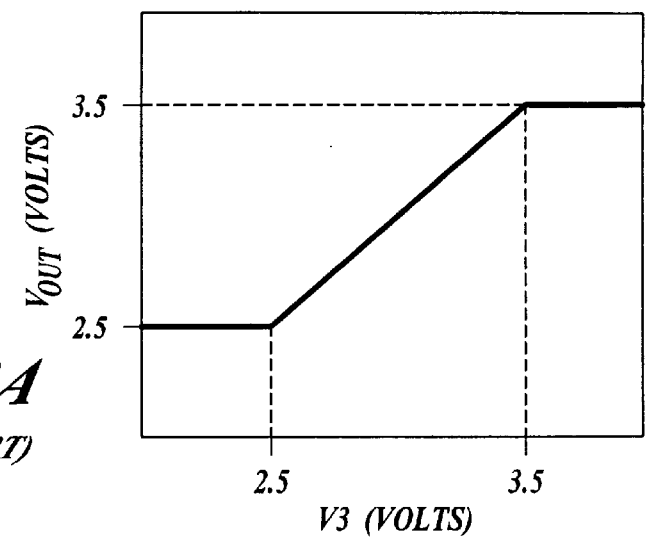
FIG. 2A is an ideal transfer curve for a prior art analog median filter.
Figure 2B:
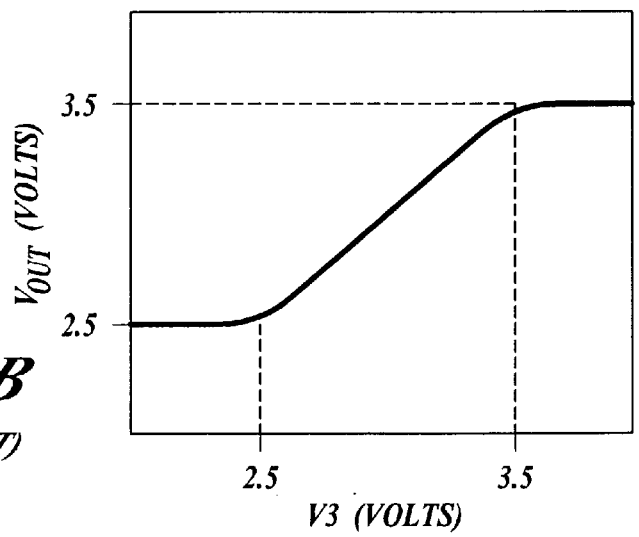
FIG. 2B is an actual transfer curve for a prior art analog median filter.
Figure 2C:
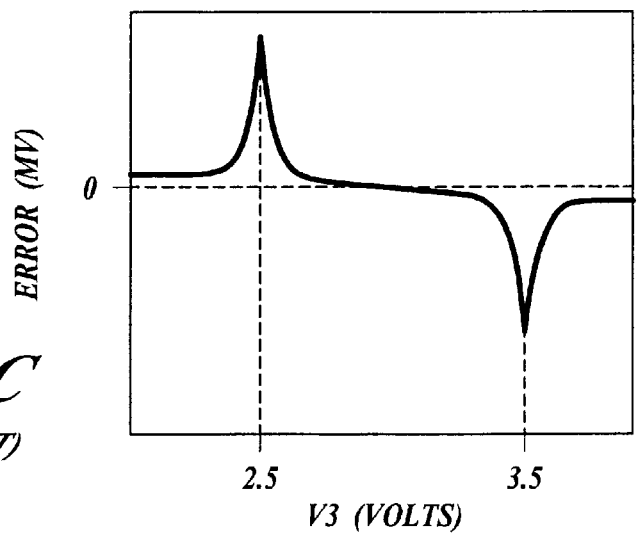
FIG. 2C is an error curve illustrating the corner errors for a prior art analog median filter.
Figure 3A:
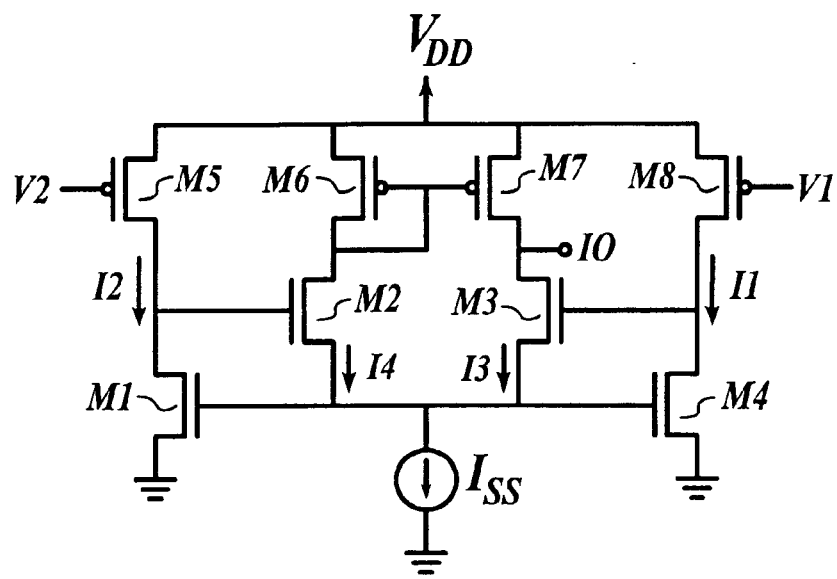
FIG. 3A is a schematic diagram of a prior art transconductance amplifier for use in an analog median filter.
Figure 3B:
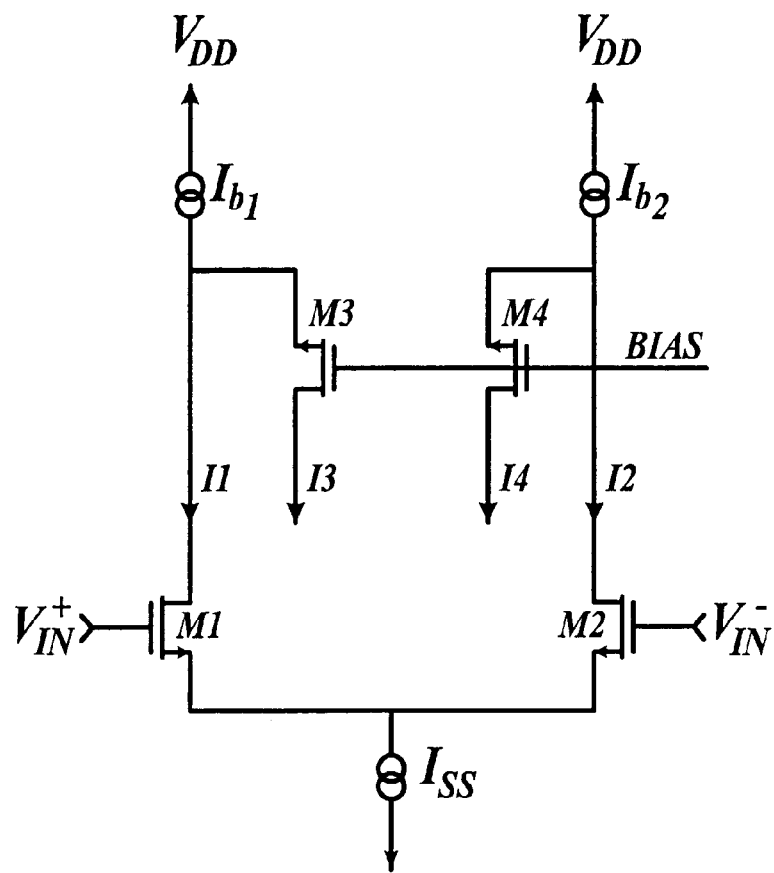
FIG. 3B is a schematic diagram of an additional prior art transconductance amplifier for use in an analog median filter.
Figure 4:
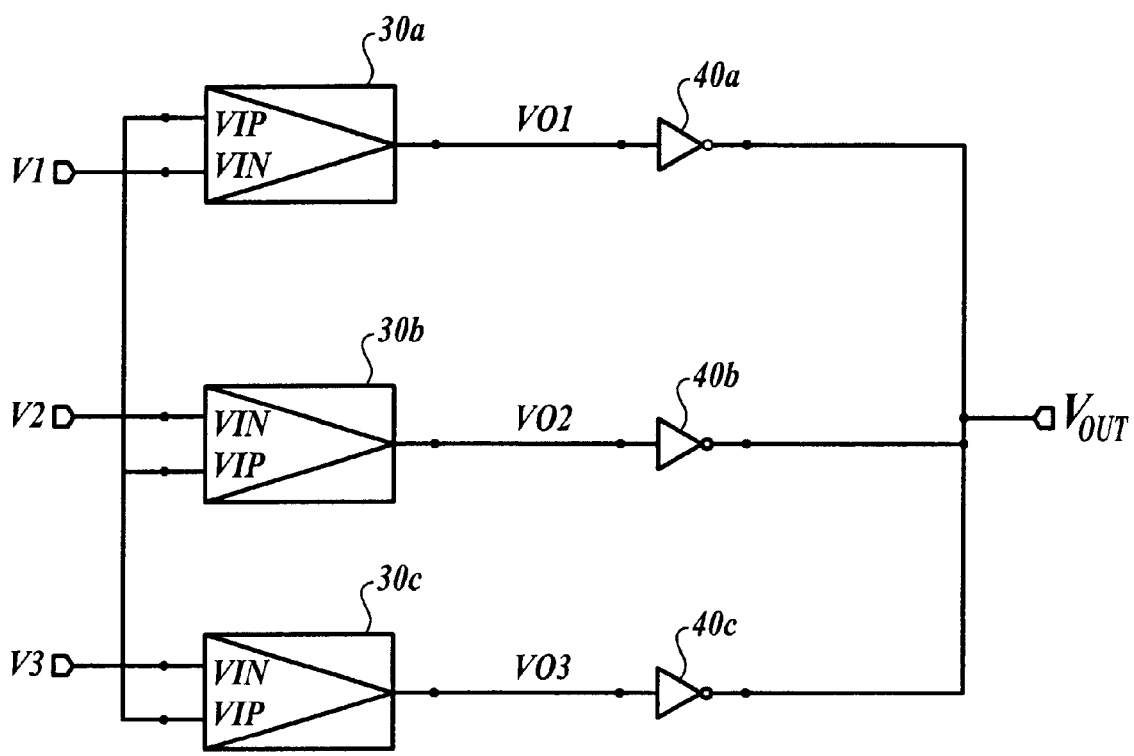
FIG. 4 is a schematic diagram of an analog median filter formed in accordance with the present invention.

With reference to FIG. 4, an analog median filter 25 is shown. Analog median filter 25 includes three amplifiers 30a, 30b, 30c; and three inverters 40a, 40b, 40c. An input V1 is coupled to the inverting input of amplifier 30a, while an input V2 is coupled to the inverting input of amplifier 30b, and an input V3 is coupled to the inverting input of amplifier 30c. The output of amplifier 30a is coupled to, the input of inverter 40a, while the output of amplifier 30b is coupled to the input of inverter 40b, and the output of amplifier 30c is coupled to the input of inverter 40c. The outputs of inverters 40a, 40b, and 40c are coupled together at the output node $V_{out}$, which represents the output of the median filter 25. The output $V_{out}$ is fed back to the noninverting inputs to the amplifiers 30a, 30b, and 30c.

The circuit of FIG. 4 has certain advantages over the prior art. As described above, one of the problems with prior art analog median filters is that while they may have a relatively sharp transfer curve at certain levels, they may have insufficient current to keep the corners sharp in certain actual applications. As described above, the sharpness of the transfer curve corners determines the corner error (a/k/a peak error) levels. In addition, the high gains of the multiple stages may often make the total output unstable, as the voltage swings become too great.

To sharpen the corners of the transfer curve, the circuit of FIG. 4 utilizes CMOS inverters 40a, 40b, and 40c. While the gain of the inverters is very low, they help provide needed current to sharpen the corners of the transfer curve. Thus, the inverters act as a type of current source in the circuit. The circuit of FIG. 4 thus has a transfer curve with sharp corners in actual applications. In addition, the low gain of the inverters helps produce a more stable output. This represents a significant improvement over the prior art.

Figure 5A:
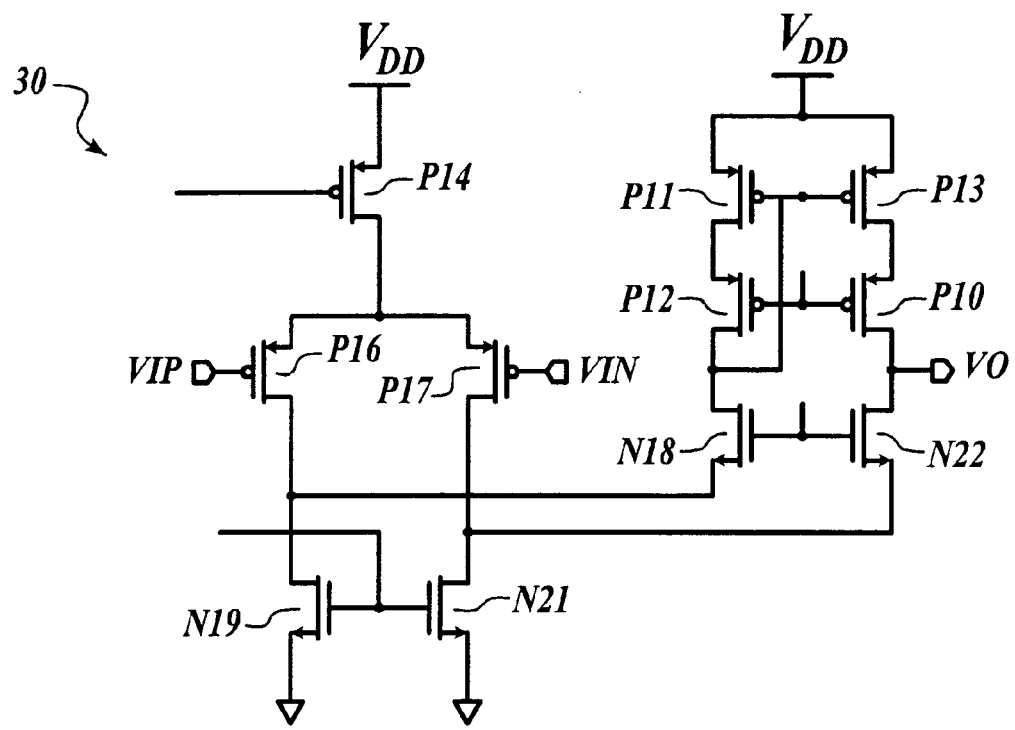
FIG. 5A is a schematic diagram of an actual embodiment of one of the transconductance amplifiers of FIG. 4.

FIG. 5A illustrates an actual embodiment of one of the transconductance amplifiers 30 of FIG. 4. The circuit of FIG.

5A is a folded cascode differential operational amplifier. As illustrated in FIG. 5A, the inverting input of the amplifier 30 is received at the gate of a PMOS transistor P16, while the noninverting input is received at the gate of a PMOS transistor P17. The sources of the PMOS transistors P16 and P17 are coupled together and are coupled to the drain of a PMOS transistor P14. The gate of PMOS transistor P14 receives a bias signal PBIAS1, while the source of the PMOS transistor P14 is coupled to a positive rail $V_{DD}$.

The drains of PMOS transistors P16 and P17 are coupled to the drains of NMOS transistors N19 and N21, respectively. The gates of NMOS transistors N19 and N21 are coupled together and receive a bias signal NBIAS1, while the sources of NMOS transistors N19 and N21 are coupled to ground. The drain of NMOS transistor N19 is coupled to the source of an NMOS transistor N18, while the drain of NMOS transistor 21 is coupled to the source of an NMOS transistor N22. The gates of NMOS transistors N18 and N22 are coupled together and receive a bias signal NBIAS2. The output of the amplifier 30 is taken from the drain of the NMOS transistor N22.

The drain of NMOS transistor N18 is coupled to the drain of a PMOS transistor P12, while the drain of NMOS transistor N22 is coupled to the drain of a PMOS transistor P10. The gates of PMOS transistors P10 and P12 are coupled together, and receive a bias signal PBIAS2. The source of PMOS transistor P12 is coupled to the drain of a PMOS transistor P11, while the source of PMOS transistor P10 is coupled to the drain of a PMOS transistor P13. The gates of PMOS transistors P11 and P13 are coupled together and are coupled to the drain of PMOS transistor P12. The sources of PMOS transistors P11 and P13 are coupled together and are coupled to the positive rail $V_{DD}$.

As described above, the configuration illustrated in FIG. 5A is a folded cascode differential operational amplifier. However, it will be realized that other differential amplifiers may be used for the purposes of the circuit of FIG. 4. In general, the amplifiers used should have a very high voltage gain. As described above, this voltage gain is transferred into a current gain by the CMOS inverters.

Figure 5B:
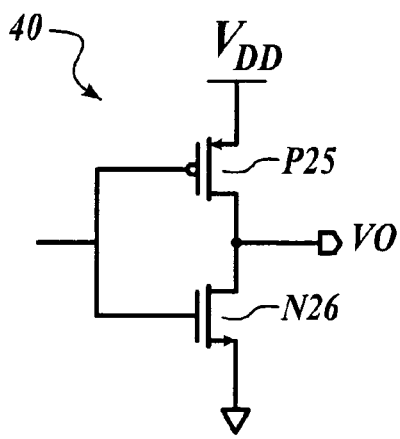
FIG. 5B is a schematic diagram of an actual embodiment of one of the CMOS inverters of FIG. 4.

FIG. 5B illustrates an actual embodiment of one of the CMOS inverters 40 of FIG. 4. As illustrated in FIG. 5B, the CMOS inverter 40 includes a PMOS transistor P25 and an NMOS transistor N26. The gate of the PMOS transistor P25 and the gate of the NMOS transistor N26 are coupled together and receive the input to the CMOS inverter 40. The source of the PMOS transistor P25 is coupled to the positive rail $V_{DD}$, while the source of NMOS transistor N26 is coupled to ground. The drain of PMOS transistor P25 and the drain of NMOS transistor N26 are coupled together and provide the output of the CMOS inverter 40.

As described above, the inverters 40a, 40b, and 40c are used in the circuit of FIG. 4 to provide sufficient current to sharpen the corners of the transfer curve. In addition, because the outputs are inverted, the inputs V1, V2, and V3 are provided to the inverting inputs, while the feedback loop is provided to the noninverting inputs. It is preferred to have nearly equal current from the PMOS transistor P25 and NMOS transistor N26 of the CMOS inverter 40. Because NMOS transistors are generally stronger, in the preferred embodiment it is generally desirable to have the PMOS transistor P25 be three times the size of the NMOS transistor N26. In a preferred embodiment for a selected CMOS image processing application, a W/L ratio of 0.8/6 for the NMOS transistor N26 will dictate a W/L ratio of 0.8/2 for the PMOS transistor P25. The low voltage gain of the inverters allows a more stable output to be produced.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An analog median filter for use in an image sensor, said image sensor processing image signals, said analog median filter comprising:
    (a) first, second, and third amplifiers, said first, second, and third amplifiers receiving first, second, and third input signals, respectively;
    (b) first, second, and third inverters, said first inverter being coupled to the output of said first amplifier, said second inverter being coupled to the output of said second amplifier, and said third inverter being coupled to the output of said third amplifier; and
    (c) the outputs of said first, second, and third inverters being coupled together and fed back to the amplifiers in a feedback loop.

2. The median filter of claim 1, wherein the amplifiers are differential amplifiers with inverting and noninverting inputs, the first, second, and third input signals being received at the inverting inputs of the amplifiers.

3. The median filter of claim 2, wherein the feedback loop is coupled to the noninverting inputs of the amplifiers.

4. The median filter of claim 1, wherein the amplifiers are folded cascode differential amplifiers.

5. The median filter of claim 1, wherein the inverters are CMOS inverters.

6. The median filter of claim 1, wherein the inverters have a low voltage gain and sufficient current source characteristics so as to meet the necessary current requirements of the median filter, while still maintaining stable voltage operation for a desired range of inputs.

7. An analog median filter for use in an image sensor, said image sensor processing image signals, said analog median filter comprising:
    (a) a plurality of amplifiers of an odd number, said plurality of amplifiers receiving input signals;
    (b) a plurality of inverters coupled to said amplifiers, said inverters being used to increase the current gain of the analog median filter; and
    (c) a feedback loop coupling the outputs of the amplifiers to the inputs of the amplifiers.

8. The median filter of claim 7, wherein the amplifiers are differential amplifiers with inverting and noninverting inputs, the input signals being received at the inverting inputs of the amplifiers.

9. The median filter of claim 8, wherein the feedback loop is coupled to the noninverting inputs of the amplifiers.

10. The median filter of claim 7, wherein the amplifiers are folded cascode differential amplifiers.

11. The median filter of claim 7, wherein the inverters are CMOS inverters.

12. The median filter of claim 7, wherein the inverters have a low voltage gain and sufficient current source characteristics so as to meet the necessary current requirements of the median filter, while still maintaining stable voltage operation for a desired range of inputs.

13. An analog median filter for use in an image sensor, said image sensor processing image signals, said analog median filter comprising:
    (a) a plurality of amplifiers, each amplifier receiving an input signal;
    (b) a current source, said current source being coupled to the output of at least one of said amplifiers; and (c) a feedback loop for coupling the outputs of said plurality of amplifiers to the inputs of said plurality of amplifiers.

14. The median filter of claim 13, wherein the amplifiers are differential amplifiers with inverting and noninverting inputs, the input signals being received at the inverting inputs of the amplifiers.

15. The median filter of claim 14, wherein the feedback loop is coupled to the noninverting inputs of the amplifiers.

16. The median filter of claim 13, wherein the amplifiers are folded cascode differential amplifiers.

17. The median filter of claim 13, wherein the current source comprises a CMOS inverter.

18. The median filter of claim 13, wherein the current source has a low voltage gain such that the current source is able to meet the necessary current requirements of the median filter while still maintaining stable voltage operation for a desired range of inputs.

19. An analog median filter for use in an image sensor, said image sensor processing image signals, said analog median filter comprising:

(a) a first stage comprising a plurality of amplifiers having a plurality of inputs for receiving a plurality of input signals, said first stage having high voltage gain characteristics;

(b) a second stage comprising a plurality of inverters coupled to the amplifiers, said second stage acting as a current source, having a low voltage gain, and generating an output; and (c) a feedback loop for coupling the output of said second stage to the inputs of said first stage.

20. The median filter of claim 19, wherein the amplifiers are folded cascode differential amplifiers and the inverters are CMOS inverters.

* * * * *